Figures 1, 2:
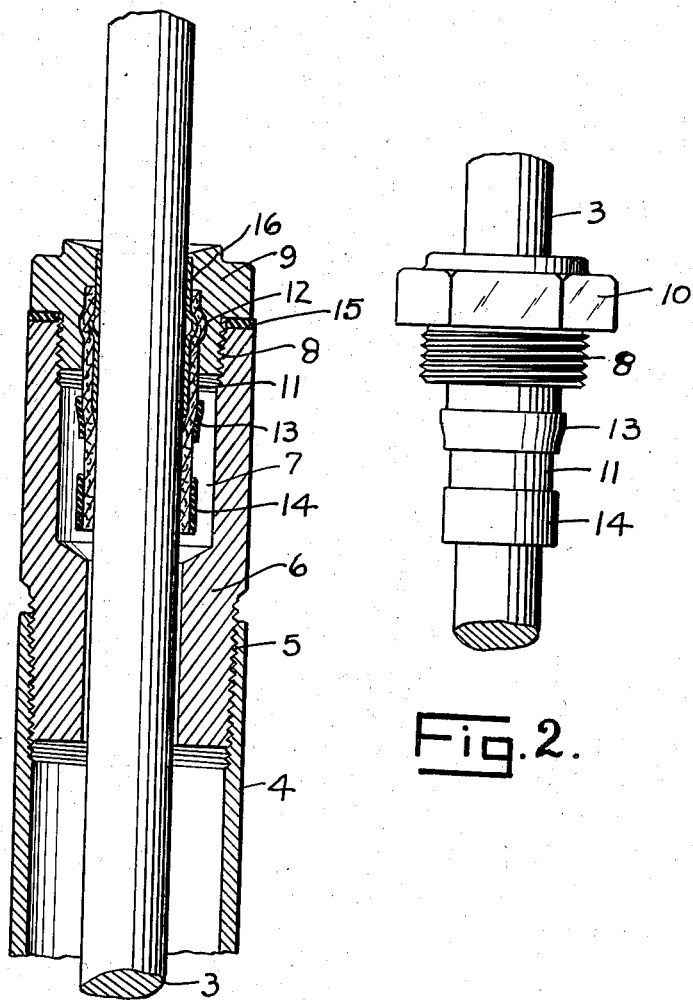

Sept. 21, 1937.  E. J. YOCKEY  2,093,627

STUFFING BOX

Filed May 27, 1935

Emil J. Yockey, Inventor

By Jesse R. Stone & Lester B. Clark

Attorneys

Patented Sept. 21, 1937

2,093,627

UNITED STATES PATENT OFFICE 2,093,627

STUFFING BOX

Emil J. Yockey, Mackay, Tex.

Application May 27, 1935, Serial No. 23,671

2 Claims. (Cl. 286—26)

My invention relates to stuffing boxes and has particular adaptation to stuffing boxes to be employed about a longitudinally slidable rod.

It is an object of the invention to provide a stuffing box which is adapted to preserve a seal upon the rod by resilient means holding the same against the rod.

It is a further object of the invention to provide a packing for stuffing boxes in which the packing is secured to the gland so that it may be handled as a unit with the gland in use.

It is a further object of the invention to provide a combined metal and pliable packing unit which may be held in position partly by the fluid pressure which is to be packed off.

Another object of the invention is to provide a packing unit which may be easily and cheaply manufactured and quickly applied in service.

In the drawing herewith, Fig. 1 is a central longitudinal section through a stuffing box embodying the invention.

Fig. 2 is a side elevation of the packing member and gland removed from the box.

I have shown my invention as applied to a pump on which it performs the service of sealing about the reciprocating pump rod 3. The tubing or cylinder in which the piston is adapted to work is shown at 4. This tubing is threaded interiorly at its upper end for attachment at 5 to the stuffing box member 6.

The stuffing box 6 has its outer end formed with an interior chamber 7 and the upper end is threaded at 8 for engagement with the threaded gland member 9.

The gland is formed with a polygonal exterior on its outer end at 10 for engagement with a wrench whereby it may be screwed into the outer end of the stuffing box. The interior of the tubular nut or gland member 9 is recessed to receive an inner sleeve 16 of soft metal such as copper or brass. Said sleeve extends downwardly and projects beyond the inner end of the gland and is of such size as to fit closely against the pump rod 3.

Outside the metal sleeve 16 and fitting closely thereon is a packing sleeve 11 of flexible material such as leather or rubberized composition. Said sleeve fits tightly over the metal sleeve and extends inwardly beyond the metal sleeve to a point spaced from the lower end of the stuffing box. It is secured with the metal sleeve 16 to the gland member 9 by the expansion of the sleeve into an annular groove or recess 12 on the interior of the gland member. This is done by placing the metal and the flexible sleeve together in position within the gland and then expanding the soft metal sleeve outwardly to clamp the two sleeves together into the annular groove 12.

To hold the outer flexible sleeve 11 tightly against the pump rod I employ elastic bands 13 and 14. These bands may be made of a good quality of rubber of smaller normal diameter than that of the packing sleeve and are stretched or placed under strain and fitted over the flexible packing sleeve. They tend to exert a constant inward pressure, holding the packing sleeve tightly against the rod. The band 13 is preferably placed at a position opposite the end of the inner metal sleeve 16. The sleeve 14 is shown at the end of the packing sleeve. It is to be understood that while I have shown these flexible members as made up of rubber, other elastic bands of metal, or otherwise, may be employed in the place thereof.

As a further precaution I place a flexible gasket member 15 between the gland 9 and the outer end of the stuffing box to guard against the leakage of fluid past the threaded connection 8.

It will be seen that any fluid tending to escape outwardly into the stuffing box may be received in the chamber 7 and tend to exert a force against the outer surface of the packing sleeve and assist in holding it firmly in sealing engagement with the rod.

My packing member will be found to be simple and compact in use and adapted to maintain a seal with the rod for exceptionally long periods of time without leakage. The employment of elastic bands around the outer circumference of the sealing sleeve acts to maintain a sealing engagement between the sleeve and rod even after considerable wear in use has taken place. This therefore materially extends the life of the sealing member.

What is claimed as new is:

1. A stuffing box for rods, a tubular gland thereon, a metal sleeve fitting in said gland, a flexible packing sleeve outside said metal sleeve, said sleeves extending from said gland into said box, and an annular bead on said metal sleeve acting to press said flexible sleeve into an annular groove in said gland and fix said sleeves to said gland as a unit.

2. A unit for providing a seal about a rod comprising a stuffing box, a tubular gland mounted thereon, a metal sleeve fitting in said gland, a flexible packing sleeve outside said metal sleeve, said sleeves extending from said gland into said box, and an elastic band surrounding said packing sleeve and exerting an inward tension thereon to hold said sleeve in sealing engagement with a rod.

EMIL J. YOCKEY.